(12) United States Patent
Keum et al.

(10) Patent No.: US 9,826,283 B2
(45) Date of Patent: Nov. 21, 2017

(54) APPARATUS AND METHOD FOR INSERTING ADVERTISEMENT IN A BROADCASTING SYSTEM

(75) Inventors: Ji-Eun Keum, Suwon-si (KR); Jae-Yeon Song, Seoul (KR); Bo-Sun Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 13/639,382

(22) PCT Filed: Apr. 5, 2011

(86) PCT No.: PCT/KR2011/002371
§ 371 (c)(1),
(2), (4) Date: Oct. 4, 2012

(87) PCT Pub. No.: WO2011/126271
PCT Pub. Date: Oct. 13, 2011

(65) Prior Publication Data
US 2013/0031580 A1    Jan. 31, 2013

(30) Foreign Application Priority Data

Apr. 5, 2010 (KR) .................. 10-2010-0031151

(51) Int. Cl.
| | | |
|---|---|---|
| H04N 21/81 | (2011.01) | |
| G06Q 30/02 | (2012.01) | |
| H04H 60/59 | (2008.01) | |
| H04L 29/06 | (2006.01) | |
| H04N 21/266 | (2011.01) | |

(Continued)

(52) U.S. Cl.
CPC .......... *H04N 21/812* (2013.01); *G06Q 30/00* (2013.01); *G06Q 30/02* (2013.01); *H04H 60/06* (2013.01); *H04H 60/59* (2013.01); *H04L 65/00* (2013.01); *H04L 65/40* (2013.01); *H04L 67/20* (2013.01); *H04N 21/26603* (2013.01); *H04L 65/605* (2013.01)

(58) Field of Classification Search
None
See application file for complete search history.

(56) References Cited

U.S. PATENT DOCUMENTS

2002/0143976 A1* 10/2002 Barker .................. H04L 29/06
709/231
2003/0139966 A1    7/2003 Sirota et al.
(Continued)

FOREIGN PATENT DOCUMENTS

JP      2002-330416 A    11/2002
KR   10-2006-0066096 A    6/2006
(Continued)

*Primary Examiner* — Michael Telan
(74) *Attorney, Agent, or Firm* — Jefferson IP Law, LLP

(57) ABSTRACT

Provided is an apparatus and method for inserting an advertisement in a broadcasting system based on adaptive streaming. To this end, content related information for advertisement content is generated by an advertisement providing server and a content transmitting server. A client is informed of an update required time of the content related information to receive new content related information from the content transmitting server. Therefore, the advertisement content can be reproduced in a set period.

16 Claims, 6 Drawing Sheets

(51) Int. Cl.
    *H04L 29/08*     (2006.01)
    *G06Q 30/00*     (2012.01)
    *H04H 60/06*     (2008.01)

(56) References Cited

U.S. PATENT DOCUMENTS

| | | | |
|---|---|---|---|
| 2003/0149975 A1* | 8/2003 | Eldering et al. | 725/34 |
| 2003/0226151 A1* | 12/2003 | Hamada | H04N 7/17318 725/132 |
| 2004/0015994 A1 | 1/2004 | Choi et al. | |
| 2005/0216932 A1* | 9/2005 | Danker | G06Q 30/00 725/32 |
| 2007/0136742 A1* | 6/2007 | Sparrell | 725/32 |
| 2007/0156739 A1* | 7/2007 | Black | G11B 27/105 |
| 2008/0046919 A1* | 2/2008 | Carmi et al. | 725/32 |
| 2009/0083631 A1 | 3/2009 | Sidi et al. | |
| 2009/0307732 A1* | 12/2009 | Cohen | G06Q 30/02 725/87 |

FOREIGN PATENT DOCUMENTS

| | | |
|---|---|---|
| KR | 10-2008-0015488 A | 2/2008 |
| WO | 2008/075837 A1 | 6/2008 |

* cited by examiner

APPARATUS AND METHOD FOR INSERTING ADVERTISEMENT IN A BROADCASTING SYSTEM

CROSS-REFERENCE TO RELATED PATENT APPLICATION

This application is a National Stage application under 35 U.S.C. §371 of an International application filed on Apr. 5, 2011 and assigned application No. PCT/KR2011/002371, and claims the benefit under 35 U.S.C. §365(b) of a Korean patent application filed Apr. 5, 2010 in the Korean Intellectual Property Office and assigned application No. 10-2010-0031151, the entire disclosure of each of which is hereby incorporated by reference.

BACKGROUND OF THE INVENTION

Field of the Invention

The present invention relates to an apparatus and method for inserting an advertisement in a broadcasting system, and more particularly, to an apparatus and method for inserting an advertisement in a broadcasting system based on an adaptive streaming function.

Description of the Related Art

Recently, with the increase in use of on-line contents, smooth contents transmission has been regarded important. In line with this, there has emerged a need for adaptive streaming in which a bit rate of content is smoothly changed according to a change of an available transmission bandwidth or the performance of user's device.

At present, various standard organizations are discussing about a transmission technique in which a user terminal selects and reproduces small portions acquired by dividing content based on a HyperText Transfer Protocol (HTTP) according to circumstances to allow a user to use the content seamlessly without a delay.

In the convergence era based on an Internet Protocol (IP), the convergence service of communication and broadcasting, a next-generation new marketable business model, has attracted attention as one of next-generation market leading techniques.

In particular, an IPTV, the mainstay of the convergence service of communication and broadcasting, not only provides a service which recombines or integrates conventional TV, speech, and data techniques, but also supports interactivity, making it possible to create a variety of business models and services.

Such IPTV technology is expanded in its application range from provisioning of a service specified in conventional limited terminal environments to provisioning of a service regardless of types of terminals, e.g., stationary terminals such as a set-top box, a Personal Computer (PC), a TV, etc., and mobile terminals such as a cellular phone, a Personal Digital Assistant (PDA), etc., and regardless of types of networks such as a wired network, a wireless network, a broadcasting network, etc. Such expansion in the application range makes it possible to provide and apply various services in various environments and to develop various forms of services taking account of various environments.

One of representative services based on the next-generation new marketable business model may be an advertisement service. Hence, to operators supporting various contents through the convergence service of communication and broadcasting, there is an urgent need for efficiently supporting an advertisement service.

SUMMARY OF THE INVENTION

Accordingly, an aspect of the present invention is to provide an apparatus and method for flexibly inserting an advertisement for a user to which a content service is provided in a broadcasting system which supports adaptive streaming.

Another aspect of the present invention is to provide an apparatus and method in which an operator arbitrarily inserts an advertisement in the middle of content when a user terminal receives live streaming in an HTTP adaptive streaming scheme from a server.

Moreover, another aspect of the present invention is to provide an apparatus and method for providing an advertisement, in which a force play out function is applied to an advertisement inserted during servicing of particular content.

In addition, another aspect of the present invention is to provide an apparatus and method in which an advertisement is inserted during servicing of particular content, and a skip function or fast forward function attempted by a user during reproduction of the inserted advertisement is blocked.

According to an aspect of the present invention, there is provided a method for providing an advertisement by a content transmitting server in a broadcasting system, the method comprising: receiving the information about the advertisement content from an advertisement providing server when data corresponding to particular content is transmitted to the at least one client in an adaptive streaming scheme; and generating new content related information, required from the at least one client for providing the advertisement content, based on the received information about the advertisement content and transmitting the generated new content related information to the at least one client.

According to another aspect of the present invention, there is provided a method for being provided with an advertisement by a client in a broadcasting system, the method comprising: receiving information about the advertisement content received from a content transmitting server when receiving data corresponding to particular content in an adaptive streaming scheme; receiving a new content related information required for being provided with the advertisement content from the content transmitting server based on the information about the advertisement content; and receiving the advertisement content based on the content related information received from the content transmitting server.

According to another aspect of the present invention, there is provided a content transmitting server for providing an advertisement in a broadcasting system, the content transmitting server comprising: a receiver for receiving the information about the advertisement content from an advertisement providing server when data corresponding to particular content is transmitted to the at least one client in an adaptive streaming scheme; and a information generator for generating new content related information, required from the at least one client for providing the advertisement content, based on the received information about the advertisement content, and a transmitter for transmitting the generated new content related information to the at least one client.

According to another aspect of the present invention, there is provided client for being provided with an advertisement in a broadcasting system, the client comprising: a transceiver for receiving information about the advertisement content received from a content transmitting server when receiving data corresponding to particular content in an adaptive streaming scheme, receiving a new content related information required for being provided with the advertisement content from the content transmitting server based on the information about the advertisement content, and receiving the advertisement content based on the new content related information received from the content transmitting server.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE EXEMPLARY EMBODIMENTS

Figure 1:
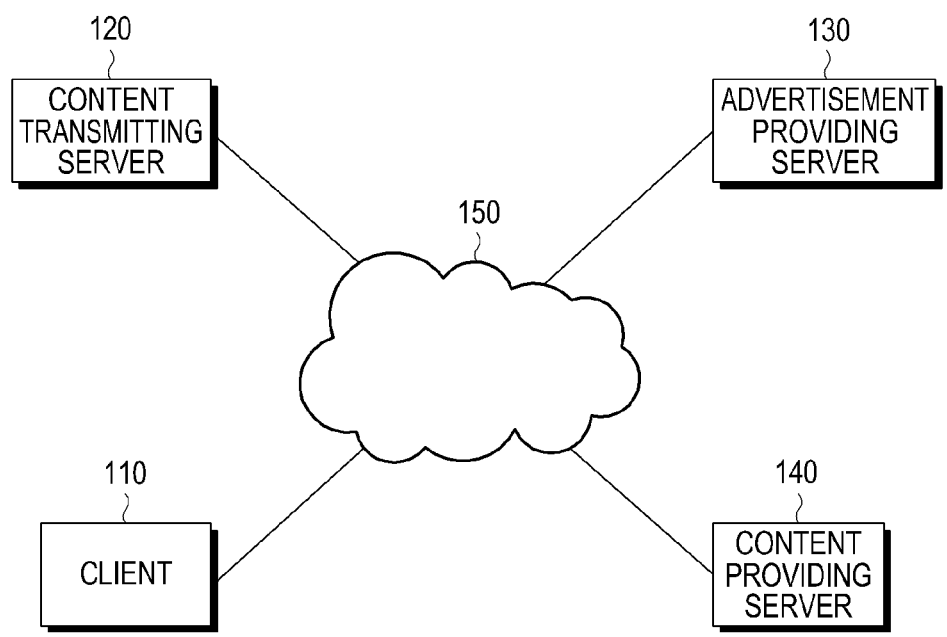
FIG. 1 is a diagram showing the architecture of a broadcasting system for servicing an advertisement according to an exemplary embodiment of the present invention.

Hereinafter, an exemplary embodiment of the present invention will be described in detail with reference to the accompanying drawings. Throughout the drawings, like components are referred to by like reference numerals.

In the following description, specific items are described only to provide overall understanding of the present invention and it is apparent to those of ordinary skill in the art that the present invention can be executed without those specific items. A detailed description of known functions and configurations will be omitted when it may unnecessarily obscure the subject matter of the present invention.

In the following detailed description, a representative embodiment of the present invention for achieving the foregoing technical objects will be proposed. In addition, while names of entities defined in Open Internet Protocol TV Forum (OIPF) and $3^{rd}$ Generation Partnership Project (3GPP) will be used herein for convenience purpose only, they are not intended to limit the scope of the present invention, and the invention can be applied to any system having similar technical backgrounds.

FIG. 1 is a diagram showing the architecture of a broadcasting system for servicing an advertisement according to an exemplary embodiment of the present invention.

Referring to FIG. 1, a broadcasting network 150 is a network for data transmission/reception among a client 110, a content transmitting server 120, an advertisement providing server 130, and a content providing server 140 which constitute the broadcasting system. Thus, communication among the client 110, the content transmitting server 120, the advertisement providing server 130, and the content providing server 140 is achieved through the broadcasting network 150. The broadcasting network 150 means a network which is implemented by a wired network, a wireless network, or a combination of a wired network and a wireless network to transmit data having a predetermined format.

The content providing server 120 configures a file including Multimedia Presentation Description (MPD), which will hereinafter be referred to as an "MPD" file, to support an adaptive streaming scheme. The MPD collectively refers to any information required for the client 110 to be serviced with various contents including advertisement content in the adaptive streaming scheme. The content transmitting server 120 transmits the configured MPD file to every client coupled to the broadcasting network 150.

The content transmitting server 120 receives information about advertisement content from the advertisement providing server 130. The information about the advertisement content includes an advertisement insertion time (or moment), total required time for an advertisement, and position information of the advertisement content. Herein, the advertisement insertion time is information about a relative time at which designated advertisement content is to be inserted in a period corresponding to a service of particular content. The total required time for an advertisement is total time for which the designated advertisement content is to be reproduced by the client 110. The position information of the advertisement content is information about a position (for example, Uniform Resource Locator (URL) information) at which the advertisement content to be provided to the client 110 is present.

The content providing server 120 generates a new MPD file required for the client 110 to be provided with the designated advertisement content based on the information about the advertisement content received from the advertisement providing server 130. The generated new MPD file includes information about a dedicated period for the advertisement, information about a position at which the dedicated period for the advertisement is to be inserted in a period corresponding to a service of the existing content, and information about a time at which the period corresponding to the service of the existing content is to be resumed after the advertisement. Herein, the dedicated period is a newly designated period for providing the advertisement content, and the position at which the dedicated period for the advertisement is to be inserted is a position at which a period for providing the designated advertisement content among periods of the content provided by the client 110 is to be inserted. The time at which the period corresponding to the service of the content after the advertisement is to be resumed means a start time at which the service of the existing content reserved due to provisioning of the designated advertisement content is to be resumed.

The content transmitting server 120, upon receiving the information about the advertisement content from the advertisement providing server 130, calculates an update required time (or moment) of the MPD file necessary for the service of the designated advertisement content. Herein, the updated required time of the MPD file means a time at which the client 110 is to update an existing MPD file with an MPD file required for providing the designated advertisement content to the user.

The content transmitting server 120 transmits the calculated update required time of the MPD file to the client 110, and transmits the generated MPD file to the client 110 upon receiving an MPD file update request from the client 110 with the advent of the update required time.

The client 110 establishes a path for receiving data corresponding to content from the content providing server 140 or the advertisement providing server 130 based on content position information of the MPD file provided from the content transmitting server 120. For example, the path for receiving data corresponding to the content may be established by establishing a HyperText Transfer Protocol (HTTP) session with a URL which is the content position information of the MPD file.

The client 110 receives data corresponding to desired content from the content providing server 140 or data corresponding to the designated advertisement content from the advertisement providing server 130, through the established path.

The client 110 has to acquire a separate MPD file to receive data corresponding to the designated advertisement content from the advertisement providing server 130. To this end, the client 110 receives an update required time of the MPD file from the content transmitting server 120, and transmits a request for the MPD file required for the client 110 to be provided with the advertisement content to the content transmitting server 120, taking account of the received update required time. Thereafter, upon receiving the MPD file to be updated from the content transmitting server 120, the client 110 receives data corresponding to the designated advertisement content from the advertisement providing server 130 through the above-defined procedure based on the received MPD file.

Once the period for providing the designated advertisement content ends, the client 110 establishes a path with the content providing server 140 to service the reserved existing content. That is, the client 110 establishes an HTTP session with an URL designated by the MPD file to service the existing content. The client 110 resumes reception of data corresponding to the existing content from the content providing server 140.

The advertisement providing server 130 generates, stores, and provides advertisement content. To this end, the advertisement providing server 130 selects advertisement content to be provided to the client 110 and determines a time for providing the selected advertisement content. The advertisement providing server 130 provides information about the advertisement content for servicing the selected advertisement content to the content transmitting server 120.

At the request of the client 110, the advertisement providing server 130 establishes a path (HTTP session) for servicing the selected advertisement content and transmits data corresponding to the selected advertisement content to the client 110 through the established path.

At the request of the client 110, the content providing server 140 establishes a path (HTTP session) for servicing the desired content and transmits data corresponding to the desired content to the client 110 through the established path.

As such, an advertisement service scheme proposed in an embodiment of the present invention transmits an MPD file for servicing advertisement content to a client which is currently provided with particular content, and services advertisement content designated by the MPD file. Thus, regardless of time, advertisements can be dynamically provided to respective users.

Figure 2:
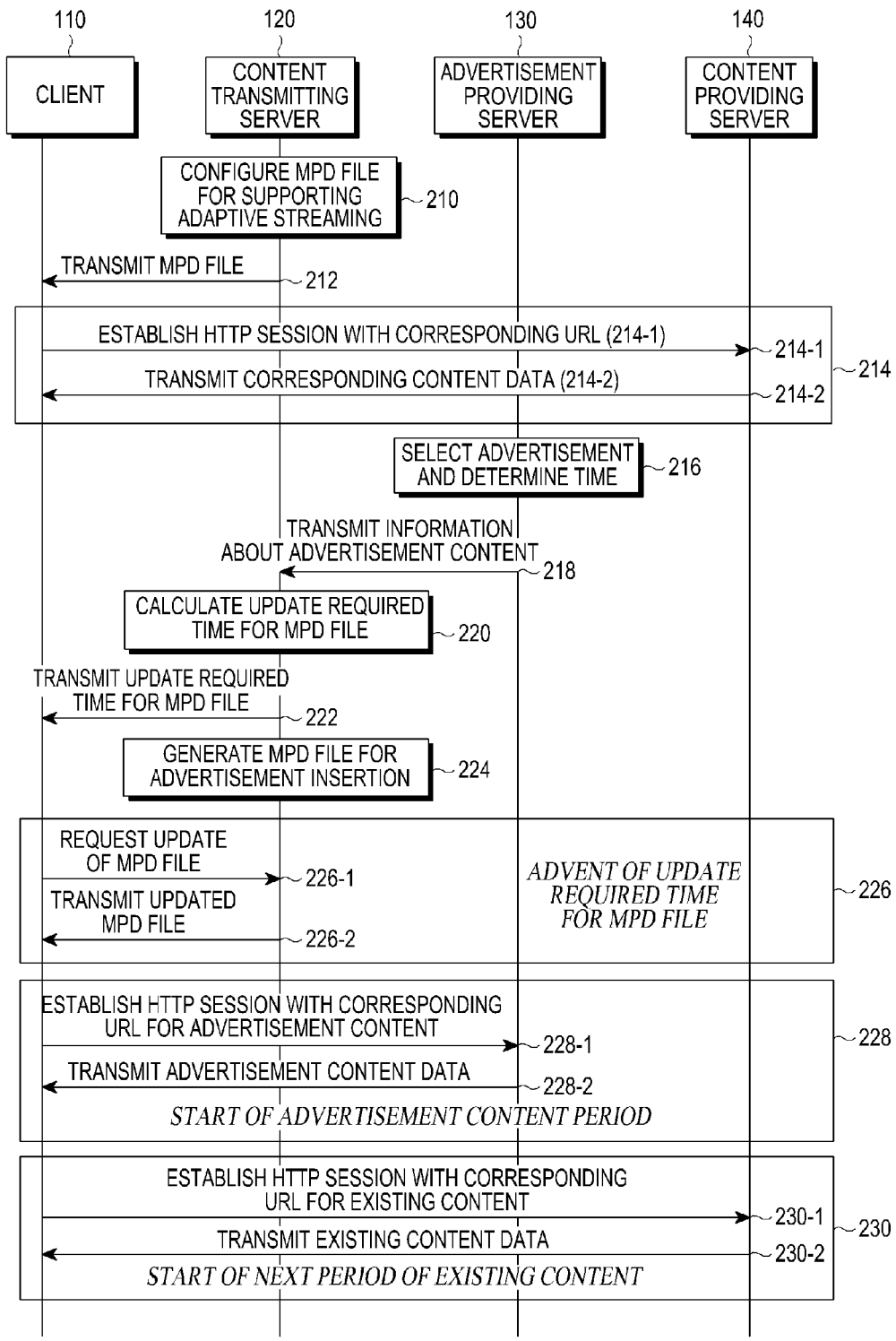
FIG. 2 is a diagram showing an example of a scenario for servicing an advertisement to a client in a broadcasting system according to an exemplary embodiment of the present invention.

FIG. 2 is a diagram showing an example of a scenario for servicing an advertisement to the client 110 in a broadcasting system according to an exemplary embodiment of the present invention. That is, shown in FIG. 2 is a scenario in which an appropriate advertisement is provided without time restrictions when a service corresponding to particular content is provided to a user.

Referring to FIG. 2, the content transmitting server 120 configures an MPD file for supporting adaptive streaming of particular content in step 210. The content transmitting server 120 transmits the configured MPD file to at least one client 110 in step 212. While one client 110 is disclosed in FIG. 2 for convenience' sake, it is obvious that a plurality of clients may exist.

The client 110, upon receiving the MPD file from the content transmitting server 120, receives data corresponding to desired content from the content providing server 140 based on content related information included in the MPD file in step 214.

To this end, the client 110 establishes an HTTP session with an URL included in the MPD file in step 214-1. The client 110 then receives a data file corresponding to the desired content through the established HTTP session in step 214-2.

Through the foregoing procedure, the content transmitting server 120 configures the MPD file including the content related information for supporting adaptive streaming of general content and provides the MPD file to the client 110. The client 110 takes segments of representation suitable for a bandwidth or the performance of the client 110 from the content providing server 140 through an HTTP session by using the MPD file and reproduces the segments.

Meanwhile, it is assumed that advertisement content to be serviced to the client 110 by the advertisement providing server 130 is generated when the client 110 receives the data corresponding to the desired content through the foregoing procedure.

The advertisement providing server 130 dynamically selects the advertisement content to be provided and determines an appropriate time for inserting the selected advertisement content in step 216. The advertisement providing server 130 then transmits position information of the selected advertisement content, total required time for an advertisement, and a relative time for inserting the advertisement content in a period corresponding to a service of particular content to the content transmitting server 120 in step 218.

The content transmitting server 120 having received information about the advertisement content from the advertisement providing server 130 then calculates a time at which an MPD file for inserting the selected advertisement content is to be updated by the client 110 in step 220. The content transmitting server 120 informs the client 110 of the calculated update required time of the MPD file in step 222. This process is changing a value corresponding to a check time of the MPD file transmitted to the client 110.

The content transmitting server 120 generates a new MPD file for advertisement insertion in step 224. That is, the new MPD file is generated based on the content related information required for the client 110 to be served with the advertisement content. The content related information is information for generating a dedicated period for an advertisement, inserting the generated dedicated period at a desired position, and then delaying a start time for resuming a period for servicing existing content by advertisement time.

Meanwhile, the client 110 monitors the advent of a check time based on the update required time provided from the content transmitting server 120, and upon the advent of the check time, the client 110 performs a procedure for updating the existing MPD file in step 226.

In other words, upon the advent of the check time, the client 110 transmits a request for updating the existing MPD file to the content transmitting server 120 in step 226-1. When the client 110 transmits the MPD file update request, it may also transmit information for identifying the current MPD file, for example, identification (ID). The MPD file update request is transmitted together with the ID so that the current MPD file can be updated with the new MPD file corresponding to the current MPD file.

Table 1 defines an example of a message transmitted by the client 110 to the content transmitting server 120 to request update of the existing MPD file.

TABLE 1

| MPD | E | I | M | The root element that carries the Media Presentation Description for a presentation. |
|---|---|---|---|---|
| ID | A | | CM (mandatory for the MPD update case) | This is the identification of each MPD. This is mandatory for the case when the MPD is needed to be updated. |

Referring to Table 1, it can be seen that the message includes an ID for identifying the current MPD file.

The content transmitting server 120, upon receiving the MPD file update request from the client 110, transmits the previously generated new MPD file to the client 110 in step 226-2.

The client 110 which updates the existing MPD file with the new MPD file reproduces the existing content and monitors whether a period for an advertisement starts based on the updated MPD file.

If the period for the advertisement starts, the client 110 receives data corresponding to designated advertisement content from the advertisement providing server 130 in step 228. That is, upon start of the advertisement period, the client 110 connects an HTTP session with a stored position of the advertisement content in the advertisement providing server 130 in step 228-1. The stored position of the advertisement content corresponds to an URL included in the previously updated MPD file.

Once the HTTP session is established, the advertisement providing server 130 transmits data corresponding to the designated advertisement content to the client 110 in step 228-2. Thus, the client 110 reserves reproduction of the existing content and then reproduces the designated advertisement content.

Meanwhile, once a period for the advertisement content transmitted from the advertisement providing server 130 ends, the client 110 resumes reproduction of the existing content when a next period for the existing content starts in step 230. That is, if the next period for the existing content starts, the client 110 establishes an HTTP session with a stored position of the existing content in the content providing server 140 in step 230-1. The client 110 receives data corresponding to the existing content from the content providing server 140 through the established HTTP session in step 230-2.

Thus, the next period for the existing content starts sequentially from the previous period for the existing content, such that the desired content can be seamlessly received.

Figure 3:
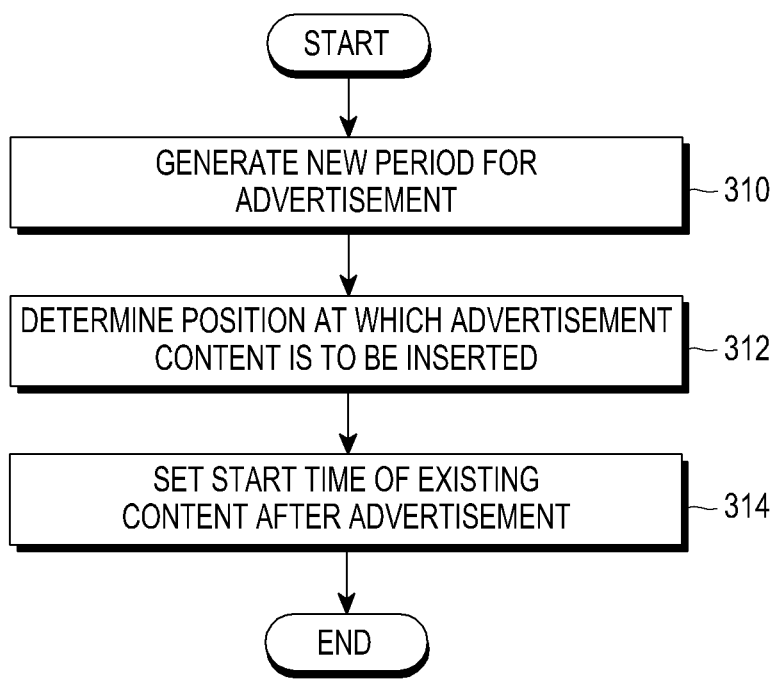
FIG. 3 is a flowchart showing in detail a procedure for updating a Multimedia Presentation Description (MPD) file for insertion of advertisement content according to an exemplary embodiment of the present invention.

FIG. 3 is a flowchart showing in detail a procedure for updating an MPD file for insertion of advertisement content according to an exemplary embodiment of the present invention. That is, shown in FIG. 3 is a detailed process in which the content transmitting server 120 generates a new MPD file for advertisement insertion in the scenario shown in FIG. 2.

Referring to FIG. 3, the content transmitting server 120 generates a new period for servicing advertisement content in step 310. In the new period are inserted information about a position at which the advertisement content is present (for example, URL information), information about segments of the advertisement contents, and attribute values corresponding to a force play out function.

The content transmitting server 120 then determines a position at which the dedicated period is to be inserted in a list of existing periods in step 312. Herein, the new period means a dedicated period for servicing the advertisement content, and the existing periods mean periods for servicing existing content.

Thus, the content transmitting server 120 determines at which time the advertisement content is to be reproduced during reproduction of the existing content in step 312.

The content transmitting server 120 sets a start time corresponding to a period for resuming reproduction among reproduction periods of the existing content after the reproduction period of the advertisement content in step 314. In other words, the content transmitting server 120 extends the reproduction time of the existing content for reproduction of the advertisement content.

In the foregoing embodiment of the present invention, both an MPD file corresponding to general content and an MPD file corresponding to advertisement content are generated by the content transmitting server 120, and the generated MPD files are transmitted to the client 110.

Therefore, the client 110 has to recognize whether the MPD file transmitted from the content transmitting server 120 corresponds to the general content or the advertisement content.

Accordingly, the content transmitting server 120 needs to include information for identifying an MPD file in the MPD file which is to be transmitted to the client 110.

Table 2 shows an example of a file format proposed to allow the client 110 to recognize a type of content.

TABLE 2

| Period | E | 1 ... N | M | Provides the information of each period |
|---|---|---|---|---|
| Content Type | A | | 0 | This provides the content type which this MPD supports. Ex, Advertisement, Multimedia content, Notification, etc. |

As can be seen from Table 2, by adding a type factor indicating whether a period corresponds to advertisement content, the client 110 can recognize a type of content corresponding to the period. The client 110 can perform a proper function by recognizing a type of content through a type factor.

If content corresponding to a period is advertisement content, it is necessary to prevent a user of the client 110 from executing a skip function or a fast forward function in that period. However, when the user desires to store content being reproduced in the client 110, pure content excluding the advertisement content can be stored. As such, a function for blocking a particular function in the client 110 is referred to as a force play out function.

Table 3 shows an example of insertion of an attribute value for supporting the force play out function.

TABLE 3

| Period | E | 1 ... N | M | Provides the information of each period |
| Force Play Out | A | | 0 | This is the indicator whether this period is not allowed for user to skip or fast forward. |

Referring to Table 3, the skip function or the fast forward function is blocked by the force play out function.

Figure 4:
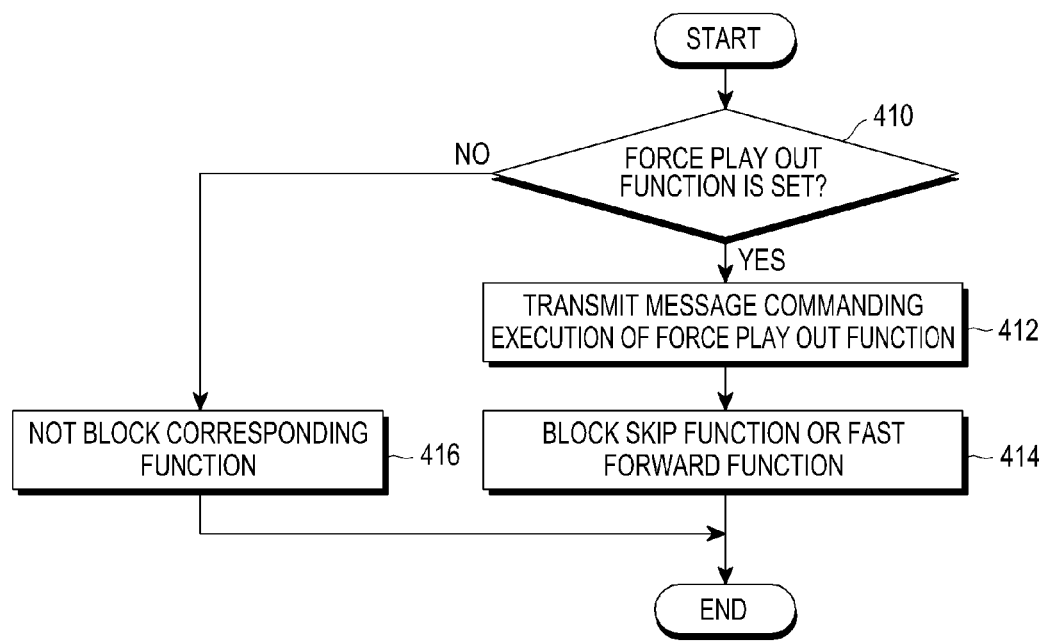
FIG. 4 is a flowchart showing a control flow for supporting a force play out function by using attribute values according to an exemplary embodiment of the present invention.

FIG. 4 is a flowchart showing a control flow for supporting the force play out function by using an attribute value according to an exemplary embodiment of the present invention.

Referring to FIG. 4, it is determined whether the force play out function is set in step 410. For example, it is determined whether an attribute value determining whether the force play out function is set is 1.

If the force play out function is set, for example, the attribute value is 1, a message commanding the client 110 to execute the force play out function is transmitted to the client 110 in step 412. Event if the user requests the skip function or the fast forward function with respect to corresponding advertisement content, the skip function or the fast forward function is blocked in step 414.

On the other hand, if the force play out function is not set, for example, the attribute value is not 1, the skip function or the fast forward function in the client 110 is not blocked in step 416.

Table 4 shows another example showing insertion of attribute values for supporting the force play out function.

TABLE 4

| Period | E | 1 ... N | M | Provides the information of each period |
| Force Play Out | E | | 0 | Provides the information about usage for force play out function |
| No Skip | A | | 0 | This is the indicator whether the client prohibits the user from executing the skip function within this period or not. |
| No Fast Forward | A | | 0 | This is the indicator whether the client prohibits the user from executing the fast forward function within this period or not. |

Table 4 shows an example where an attribute value is set for each function to support the force play out function. For example, in Table 4, whether to block one of the skip function and the fast forward function or both of them can be selectively set.

Figure 5:
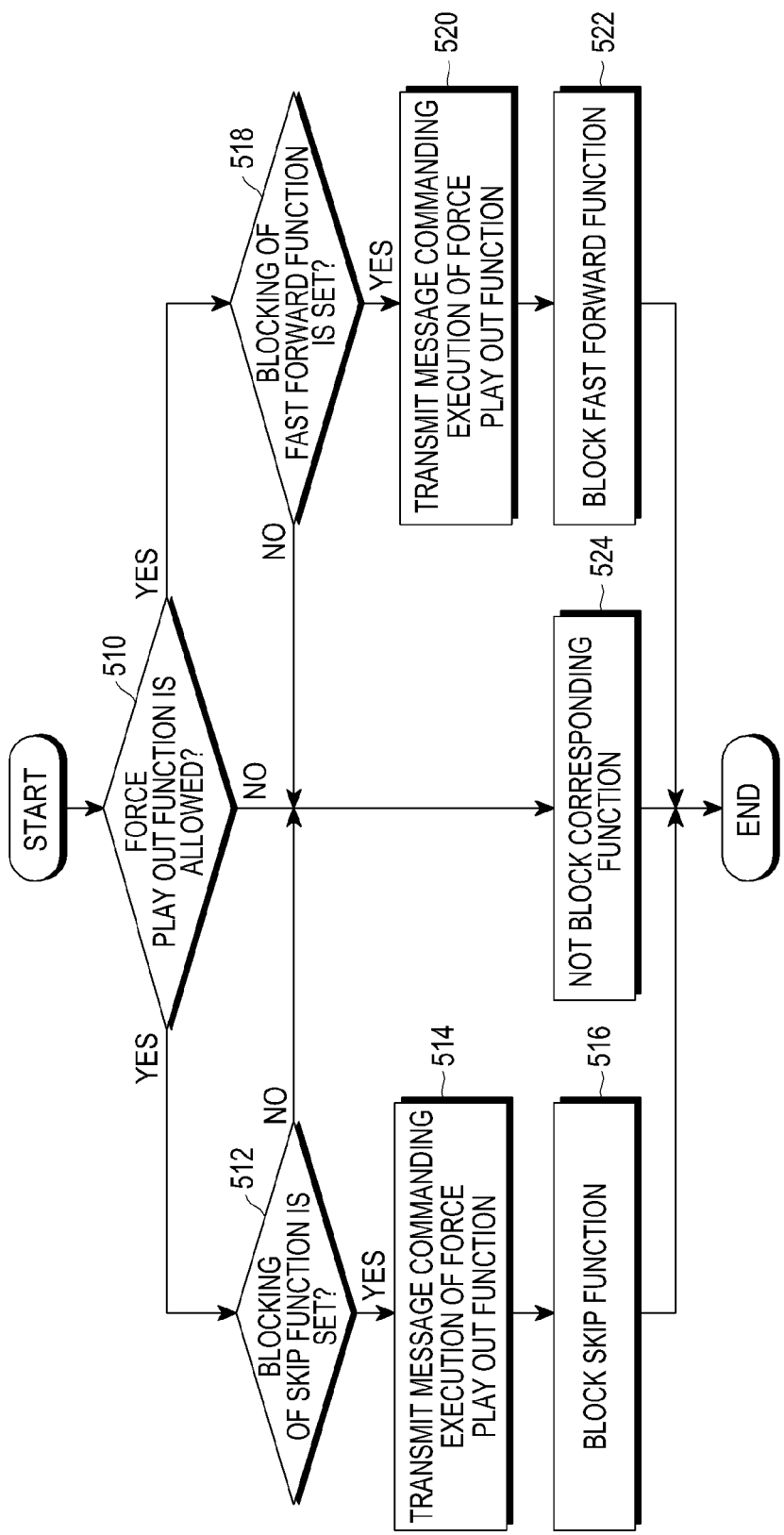
FIG. 5 is a flowchart showing another control flow for supporting a force play out function by using attribute values according to an exemplary embodiment of the present invention.

FIG. 5 is a flowchart showing another control flow for supporting the force play out function by using an attribute value according to an exemplary embodiment of the present invention.

Referring to FIG. 5, it is determined whether the force play out function is set in step 510. That is, it is determined whether use of the force play out function is allowed.

If the force play out function is allowed, it is determined whether blocking of the skip function is set in step 512 or blocking of the fast forward function is set in step 518.

If blocking of the skip function is set in step 512, a message commanding the client 110 to block the skip function through execution of the force play out is transmitted to the client 110 in step 514. Even if the user requests the skip function for corresponding advertisement content, the skip function is blocked in step 516.

If blocking of the fast forward function is set in step 518, a message commanding the client 110 to block the fast forward function through execution of the force play out is transmitted to the client 110 in step 520. Even if the user requests the fast forward function for corresponding advertisement content, the fast forward function is blocked in step 522.

If the force play out function is not allowed or if blocking of the skip function or the fast forward function is not set, the skip function or the fast forward function in the client 110 is not blocked in step 524.

Table 5 shows an embodiment of an MPD used to transmit content of a content-on-demand type.

TABLE 5

```
<MPD type="OnDemand">
    <ProgramInformation/>
    <Period start="00:00:00">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
    <Period start="00:03:10">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
    <Period start="00:06:20">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
</MPD>
```

Referring to Table 5, a second period starts after 3 minutes 10 seconds, and a third period starts after 6 minutes 20 seconds.

Table 6 shows an example of an MPD when advertisement content is included.

TABLE 6

```
<MPD type="OnDemand">
    <ProgramInformation/>
    <Period start="00:00:00">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
    <Period start="00:03:10" forcePlayOut="true">
        <Representation bandwidth="8196" mimeType="...">
            <SegmentInfo duration="10">
                <Url sourceUrl="http://ad.content.com/ad01/>
                ...
            </SegmentInfo>
        </Representation>
    </Period>
    <Period start="00:05:10">
        <Representation bandwidth="8196" mimeType="...">
            <SegmentInfo duration="10">
```

TABLE 6-continued

```
        <Url sourceUrl="http://video.content.com/movie01/>
        ...
       </SegmentInfo>
     </Representation>
   </Period>
</MPD>
```

Shown in Table 6 is an embodiment of an MPD including advertisement content which has to be newly generated when an operator desires to insert a 2-minute advertisement between a second period and a third period. The advertisement provided through the embodiment has a force play out restriction, and thus the user cannot arbitrarily skip or fast-forward the advertisement.

As can be anticipated from the foregoing description, by transmitting an MPD file for servicing advertisement content to the client which is being serviced with particular content, designated advertisement content can be inserted when the particular content is serviced. Therefore, an advertisement can be dynamically provided to each user regardless of time.

Figure 6:
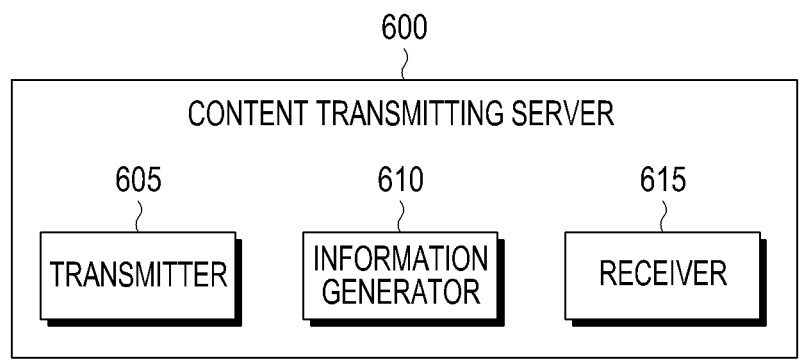
FIG. 6 is a block diagram of a content transmitting server according to an exemplary embodiment of the present invention.

FIG. 6 is a block diagram of a content transmitting server according to an exemplary embodiment of the present invention.

Referring to FIG. 6, the content transmitting server 600 comprises a receiver 605, an information generator 610 and a transmitter 615.

The receiver 605 receives the information about the advertisement content from an advertisement providing server when data corresponding to particular content is transmitted to the at least one client in an adaptive streaming scheme, the information generator 610 generates new content related information, required from the at least one client for providing the advertisement content, based on the received information about the advertisement content, the new content related information comprises information about a dedicated period for the advertisement content, a position at which the dedicated period for the advertisement content is to be inserted in a period corresponding to a service of the particular content, and a start time at which the period corresponding to the service of the particular content is to be resumed. The new content related information further comprises information indicating setting of a force play out function. the information indicating setting of the force play out function is an attribute value which blocks at least one of a skip function and a fast forward function.

Then the transmitter 615 transmits the generated new content related information to the at least one client.

Figure 7:
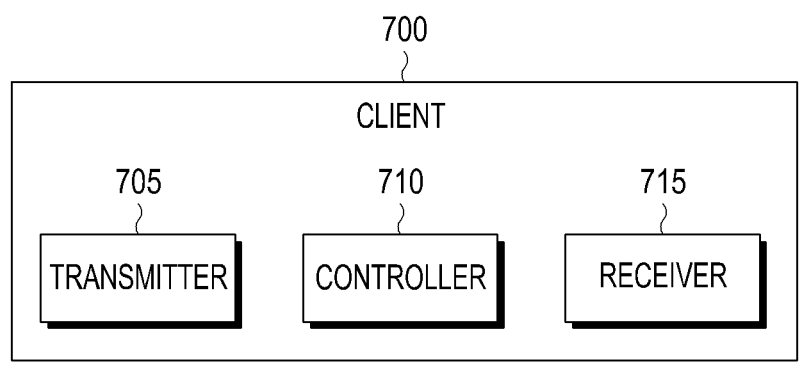
FIG. 7 is a block diagram of a client according to an exemplary embodiment of the present invention.

FIG. 7 is a block diagram of a client according to an exemplary embodiment of the present invention.

Referring to FIG. 7, the client 700 comprises a receiver 705, a controller 710 and a transmitter 715.

The receiver 705 receives information about the advertisement content received from a content transmitting server when receiving data corresponding to particular content in an adaptive streaming scheme. The receiver 705 receives a new content related information required for being provided with the advertisement content from the content transmitting server based on the information about the advertisement content.

The controller 710 obtains, from the new content related information, information about a dedicated period for the advertisement content, a position at which the dedicated period for the advertisement content is to be inserted in a period corresponding to a service of the particular content, and a start time at which the period corresponding to the service of the particular content is to be resumed. The new content related information further comprises information indicating setting of a force play out function. The information indicating setting of the force play out function is an attribute value which blocks at least one of a skip function and a fast forward function.

The receiver 705 receives the advertisement content based on the new content related information received from the content transmitting server.

And, the controller 710 obtains an update required time of the new content related information from the new content related information. Then the transmitter 715 transmits update request of the new content related information according to the advent of the update required time.

Other effects have been directly or implicitly disclosed in the foregoing detailed description.

While a detailed embodiment has been described in the present invention, various changes may be made without departing from the scope of the present invention. Accordingly, the scope of the present invention should be defined by the claims and equivalents thereof, rather than the described embodiment.

The invention claimed is:

1. A method for providing an advertisement at a content control server in a broadcasting system, the method comprising:
    transmitting, to at least one client device, description data comprising an address of a content providing server;
    receiving, from an advertisement server, information related to advertisement content while data content is received by the at least one client device on a first session established with the content providing server corresponding to the address;
    transmitting, to the at least one client device, update time information for updating the description data;
    generating updated description data based on the information related to the advertisement content; and
    if an update request of the description data comprising an identification information of the description data is received from the at least one client device based on the update time information, transmitting, to the at least one client device, the updated description data,
    wherein the updated description data comprises inserting time information of the advertisement content to be received on a second session established with the advertisement server corresponding to an advertisement server address obtained from the updated description data after stopping the reception of the data content.

2. The method of claim 1, wherein the updated description data further comprises resuming time information for the reception of the data content.

3. The method of claim 1, wherein the updated description data further comprises setting information indicating blocking at least one of a skip function and a fast forward function.

4. The method of claim 1, wherein the updated description data further comprises, when the received data content is stored to the at least one client device, a function of storing the received data content except for the received advertisement content.

5. A method for receiving an advertisement at a client device in a broadcasting system, the method comprising:
    if description data is received from a content control server, establishing a first session with a content providing server corresponding to a content providing server address obtained from the description data, and receiving data content on the established first session;

receiving, from the content control server, update time information of the description data during the reception of the data content;

transmitting, to the content control server, an update request of the description data comprising identification information of the description data at a time corresponding to the update time information;

receiving, from the content control server, updated description data in response to the update request, the updated description data being generated based on information related to advertisement content received from an advertisement server by the content control server, the updated description data comprising inserting time information of the advertisement content;

stopping the reception of the data content, establishing a second session with the advertisement server corresponding to an advertisement server address obtained from the updated description data, and receiving the advertisement content on the established second session; and if the reception of the advertisement content is completed, re-establishing the first session and resuming the stopped reception of the data content on the re-established first session, based on the inserting time information included in the updated description data.

6. The method of claim 5, wherein the updated description data further comprises resuming time information for the reception of the data content.

7. The method of claim 5, wherein the updated description data further comprises setting information indicating blocking at least one of a skip function and a fast forward function.

8. The method of claim 5, wherein the updated description data further comprises, when the received data content is stored to the at least one client device, a function of storing the received data content except for the received advertisement content.

9. A content control server for providing an advertisement in a broadcasting system, the content control server comprising:

a transceiver configured to:
transmit, to at least one client device, description data comprising an address of a content providing server,
receive, from an advertisement server, information related to advertisement content while data content is received by the at least one client device on a first session established with the content providing server corresponding to the address, and
transmit, to the at least one client device, time information for updating the description data; and a controller configured to:
generate updated description data based on the information related to the advertisement content, and
if an update request of the description data comprising an identification information of the description data is received from the at least one client device based on the update time information, control the transceiver to transmit, to the at least one client device, the updated description data, wherein the updated description data comprises inserting time information of the advertisement content to be received on a second session established with the advertisement server corresponding to an advertisement server address obtained from the updated description data after stopping the reception of the data content.

10. The content control server of claim 9, wherein the updated description data further comprises resuming time information for the reception of the data content.

11. The content control server of claim 9, wherein the updated description data further comprises setting information indicating blocking at least one of a skip function and a fast forward function.

12. The content control server of claim 9, wherein the updated description data further comprises, when the received data content is stored to the at least one client device, a function of storing the received content data except for the received advertisement content.

13. A client device for receiving an advertisement in a broadcasting system, the client device comprising:

if description data is received from a content control server, a controller configured to:
establish a first session with a content providing server corresponding to a content providing server address obtained from the description data, and
receive data content on the established first session; and a transceiver configured to:
receive, from the content control server,
update time information of the description data during the reception of the data content,
transmit, to the content control server, an update request of the description data comprising identification information of the description data at a time corresponding to the update time information, and
receive, from the content control server, updated description data in response to the update request, the updated description data being generated based on information related to advertisement content received from an advertisement server by the content control server, the updated description data comprising inserting time information of the advertisement content, wherein the controller is further configured to:
stop the reception of the data content,
establish a second session with the advertisement server corresponding to an advertisement server address obtained from the updated description data,
control the transceiver to receive the advertisement content on the established second session, and
if the reception of the advertisement content is completed, re-establish the first session and resume the stopped reception of the data content on the re-established first session based on the inserting time information included in the updated description data.

14. The client device of claim 13, wherein the updated description data further comprises resuming time information for the reception of the data content.

15. The client device of claim 13, wherein the updated description data further comprises setting information indicating blocking at least one of a skip function and a fast forward function.

16. The client device of claim 13, wherein the updated description data further comprises, when the received data content is stored to the at least one client device, a function of storing the received data content except for the received advertisement content.

* * * * *